Feb. 2, 1932. E. HORN ET AL 1,843,282
FEEDING MECHANISM FOR BAKE OVENS
Filed April 9, 1931
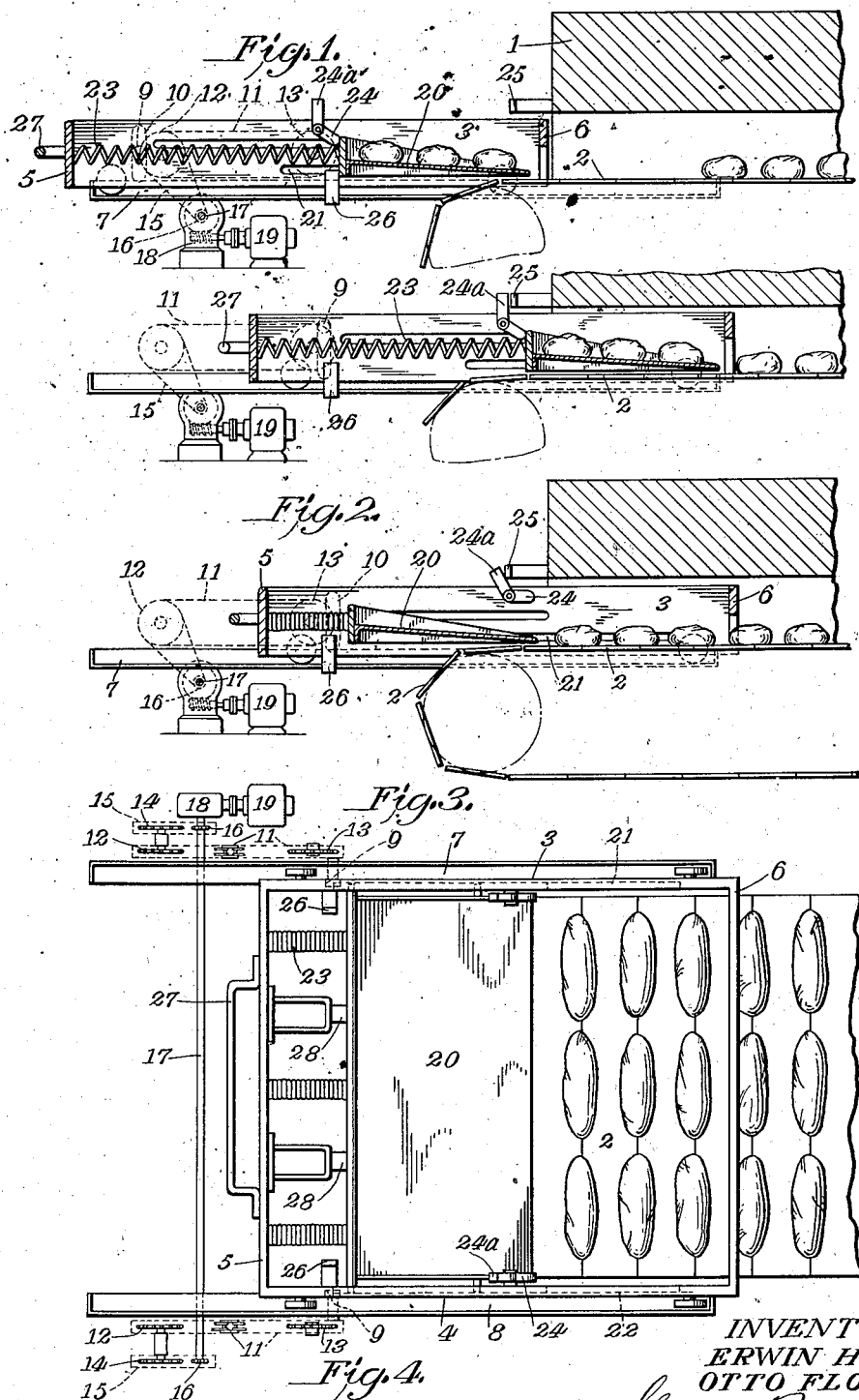
INVENTORS
ERWIN HORN
OTTO FLORIAN
BY George B. Willcox
ATTORNEY Patented Feb. 2, 1932

1,843,282

UNITED STATES PATENT OFFICE

ERWIN HORN AND OTTO FLORIAN, OF STUTTGART-CANNSTATT, GERMANY, ASSIGNORS TO BAKER PERKINS COMPANY, INC., OF SAGINAW, MICHIGAN, A CORPORATION OF NEW YORK

FEEDING MECHANISM FOR BAKE OVENS

Application filed April 9, 1931, Serial No. 528,784, and in Germany April 19, 1930.

This invention relates to apparatus for feeding dough-pieces onto the conveyors of bake ovens and has to do more particularly with the feeding of hearth bread which is baked directly on the hearth of the conveyor.

Heretofore mechanisms have been employed for this purpose which provided some sort of pusher or abutment to engage the dough pieces and push them from a feeding plate or conveyor onto the oven conveyor. This necessarily entailed some degree of injury to the delicate dough and was apt to mar its surface, producing marks in the baked loaves.

This invention has for its object to provide an improved mechanism for gently depositing the raw loaves, whether in pans or not, onto the oven conveyor. It reproduces the action of the peel board used by bakers for manually placing dough in ovens, and deposits the loaves gently on the baking surface with greater precision of placing than can be done by hand.

The invention broadly comprises the following combination of elements:

A frame is arranged for to-and-fro motion lengthwise of the conveyor and located so that when in its forward position its inner end overlaps the area of the baking surface on which loaves are to be deposited, and when in its backward position is clear of that area. A peel board is carried by the frame freely slidable lengthwise thereof and having a range of travel equal to or greater than twice its own length. Yielding means, such as a spring or springs, connect the peel board and the frame and are arranged so as to be under tension when the peel board is in its forward position relative to the frame, urging the peel board toward the rear of the frame. Means is provided to limit the backward travel of the peel board while the frame is carried backward, whereby the springs are put under tension. Means is provided for releasably engaging the peel board when the frame nears its backward limit of travel and for retaining the peel board in its forward position in the frame while the frame is moved forward. Means is provided for automatically releasing the said peel-board retaining means when the frame nears or reaches its forward limit of travel, whereby the peel board is drawn suddenly backward in the frame by the tensioned yielding means and the goods which have been placed on the peel board are deposited on the baking surface of the oven conveyor.

Referring to the drawings, Figs. 1, 2 and 3 are longitudinal vertical cross sections showing the frame and peel board in various positions in their working cycle.

Fig. 4 is a top plan view of the mechanism shown in Fig. 3.

The preferred embodiment of my invention shown in the drawings will now be described.

The invention is applied to an oven 1 having a traveling plate conveyor 2 of known type. While I have shown a plate conveyor, the feeding mechanism is equally applicable to ovens of the swinging-tray-conveyor type, reel ovens, or rotary-hearth ovens.

A carriage or frame, comprising side members 3, 4 connected at their ends by cross members 5, 6, is arranged to travel back and forth toward and away from the conveyor 2 on tracks 7, 8. When in its forward position its inner end overlaps the surface of the conveyor.

A suitable drive mechanism is provided to impart reciprocatory motion to the frame, as follows:

The frame is driven by a roller-pin 9 engaged in a slot 10 in the side member 3 of the frame. Roller-pin 9 is carried by a chain 11 which passes over a pair of sprockets 12, 13 spaced apart lengthwise of track 7 a distance dependent upon the length of travel desired for the frame. Sprocket 12 is driven by a co-axial sprocket 14, a chain 15, and a sprocket 16 fixed to a power-driven shaft 17.

The above-described driving mechanism is duplicated at the other side of the frame.

The shaft 17 is driven by a reduction gear 18 and a motor 19, or if desired, the shaft 17 may be driven from the oven conveyor driving mechanism.

A peel board 20 is carried by the frame and is slidable lengthwise thereof in guideways 21, 22 in the side members 3, 4. The length of the guideways 21, 22 is such that the peel board 20 can travel more than twice its own length. Tension springs 23 connect the rearward cross member 5 of the frame and the back edge of the peel board 20.

On the side member 3 of the frame is a latch member 24 arranged to engage the peel board when it is at its extreme forward position in the frame and to hold it in that position against the pull of the extended springs 23. It is provided with an arm 24a arranged to strike a stationary abutment 25 on the oven 1 when the frame nears its forward limit of travel, releasing the peel board so that it is pulled back sharply by the tensioned springs 23. To arrest the peel board buffers 28 are fixed to the cross member 5 of the frame.

A stationary abutment 26 is fixed to the track 7 and projects between the side members 3, 4 of the frame. It is located to engage and hold the peel board 20 while the frame is moved away from the oven conveyor. While the frame travels backward springs 23 are stretched. When the frame reaches its backward limit of travel, latch 24 engages the peel board 20 and holds it in its forward position in the frame.

It is obvious that the device can be operated equally well by hand, and a handle 27 is provided on the cross member 5 of the frame for this purpose.

The operation of the machine is as follows:
Referring to Fig. 1, which shows the frame in its withdrawn position, the peel board 20 is in its forward position in the frame. The board is now loaded with unbaked loaves. The motion of the chain 11 carries the frame and the peel board 20 forward into the oven and over the baking surface on which the goods are to be placed. While the frame is traveling forward the latch 24 holds the peel board against the pull of springs 23. When the frame nears its forward limit of travel, as shown in Fig. 2, the arm 24a of the latch 24 engages the stationary abutment 25 on the oven, releasing the latch. The tensioned springs 23 quickly withdraw the peel board 20 from under the loaves, depositing them on the conveyor 2. The peel board 20 is stopped by buffers 28.

The peel board and frame now occupy the position of Figs. 3 and 4, that is, the frame is in its forward position and the peel board is in its backward position. The roller-pin 9 on the chain 11 travels around the sprocket 13 and carries the frame backward along tracks 7 and 8. The peel board 20 engages the stationary abutment 26 and is held from further backward movement while the frame is carried back to its position of Fig. 1. During the travel of the frame the springs 23 are stretched and when the frame nears or reaches the backward limit of its travel the latch 24 engages the peel board 20, and the working parts of the apparatus are in their original position, as shown in Fig. 1.

A fresh batch of dough pieces is now placed on peel board 20 and the cycle of operations is repeated.

Having thus described our invention, what we claim and desire to secure by Letters Patent is:

1. In combination with an oven having a traveling conveyor, a mechanism for feeding dough pieces onto the oven conveyor comprising in combination a frame arranged for reciprocatory motion toward and away from said conveyor, means for imparting reciprocatory motion to said frame, a peel board carried by said frame and slidable lengthwise thereof, said frame being located so that the peel board is over the baking surface of the conveyor when both the frame and peel board are in their forward positions, spring means connecting said peel board and frame arranged to be under tension when the peel board is positioned forward relative to the frame and to urge the peel board toward the rear of the frame, a stationary abutment to engage said peel board while said frame moves backward, whereby said spring means connecting said frame and peel board is put under tension, a latch on said frame adapted to engage said peel board when the frame nears its backward limit of travel and to releasably retain said peel board in its forward position relative to the frame, and means for automatically releasing said latch when said frame nears or reaches its forward limit of travel whereby the peel board is drawn suddenly backward in the frame by the tensioned spring means.

2. In combination with an oven having a traveling conveyor, a mechanism for feeding dough pieces onto the oven conveyor comprising in combination a frame arranged for motion toward and away from said conveyor, a peel board carried by said frame and slidable lengthwise thereof, spring means connecting said peel board and frame arranged to be under tension when the peel board is positioned forward in the frame and to urge the peel board toward the rear of the frame, means for holding said peel board stationary while said frame is moved backward to tension said spring means, means for releasably holding said peel board in its forward position relative to said frame while said frame and peel board are moved forward together, and means for automatically releasing said peel-board-holding-means when said frame nears its forward limit of travel, whereby the peel board is drawn quickly backward in the frame by the tensioned spring means.

In testimony whereof, we affix our signatures.

ERWIN HORN.
OTTO FLORIAN.